United States Patent
Surveyor et al.

(10) Patent No.: US 9,046,204 B2
(45) Date of Patent: Jun. 2, 2015

(54) QUICK CONNECT TOOL WITH LOCKING COLLAR

(75) Inventors: Nilufer D. Surveyor, Tomball, TX (US); Garry Kaiser, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 593 days.

(21) Appl. No.: 12/763,383

(22) Filed: Apr. 20, 2010

(65) Prior Publication Data
US 2010/0270789 A1    Oct. 28, 2010

Related U.S. Application Data

(60) Provisional application No. 61/173,391, filed on Apr. 28, 2009.

(51) Int. Cl.
*F16L 21/08* (2006.01)

(52) U.S. Cl.
CPC ...................... *F16L 21/08* (2013.01)

(58) Field of Classification Search
USPC ............ 285/922, 90, 86, 89, 91, 148.19, 419, 285/330, 404, 398, 371, 392, 393; 166/242.6, 242.1, 380; 464/150, 151, 464/152, 158, 159; 403/359.1, 359.6, 403/359.5, 298, 301, 306, 313, 365
See application file for complete search history.

(56) References Cited

U.S. PATENT DOCUMENTS

| | | | | |
|---|---|---|---|---|
| 217,643 A * | 7/1879 | Schmidt | ........................... | 285/89 |
| 1,019,707 A * | 3/1912 | Wilcox | ........................ | 175/403 |
| 1,193,923 A * | 8/1916 | Rateike | ........................... | 285/386 |
| 1,504,363 A * | 8/1924 | Madigan | ................... | 285/148.16 |
| 1,507,991 A * | 9/1924 | Edwards | ........................ | 285/330 |
| 1,570,155 A * | 1/1926 | Karbowski | ..................... | 285/328 |
| 1,675,808 A * | 7/1928 | Kliss | ............................. | 285/388 |
| 1,866,863 A * | 7/1932 | Richardson | .................. | 279/19.6 |
| 1,977,847 A * | 10/1934 | Gentle | ........................... | 285/322 |
| 1,982,915 A * | 12/1934 | Jenks | ................................ | 285/3 |
| 1,983,977 A * | 12/1934 | Geiger | ........................... | 277/622 |
| 2,016,262 A * | 10/1935 | Arey et al. | ..................... | 285/330 |
| 2,039,945 A * | 5/1936 | Wickersham et al. | ........... | 285/84 |
| 2,049,289 A * | 7/1936 | Burns et al. | ...................... | 464/21 |
| 2,176,504 A * | 10/1939 | Mclaughlin | ..................... | 285/81 |
| 2,362,686 A * | 11/1944 | De Lano | ...................... | 285/332.3 |
| 2,443,688 A * | 6/1948 | McFarland | ....................... | 403/29 |
| 2,713,503 A * | 7/1955 | Ekholm | ...................... | 285/146.2 |
| 2,874,546 A * | 2/1959 | Fox | ................................. | 405/250 |
| 3,158,388 A * | 11/1964 | Marshall | ......................... | 285/90 |

(Continued)

FOREIGN PATENT DOCUMENTS

WO    0066929    11/2000

OTHER PUBLICATIONS

Model B Quick Connect, [online]; [retrieved on Jul. 28, 2010]; retrieved from the Internet: http://www.slb.com/services/coiled_tubing/tools/packers_hangers_plugs_aspx.

(Continued)

*Primary Examiner* — Daniel P Stodola
*Assistant Examiner* — James Linford
(74) *Attorney, Agent, or Firm* — Cantor Colburn LLP

(57) ABSTRACT

A quick connect tool collar including a multipart collar body. A rib extending radially inwardly from the collar body and one or more recesses in the collar body at an inside dimension surface thereof. One or more profiles at an outside dimension surface of the collar body.

8 Claims, 4 Drawing Sheets

(56) References Cited

U.S. PATENT DOCUMENTS

| | | | |
|---|---|---|---|
| 4,043,575 A * | 8/1977 | Roth | 285/90 |
| 4,289,202 A * | 9/1981 | Henderson | 166/212 |
| 4,357,137 A * | 11/1982 | Brown | 464/75 |
| 4,531,766 A * | 7/1985 | Crase | 285/18 |
| 4,652,021 A | 3/1987 | Pido | |
| 4,767,310 A * | 8/1988 | Neumann et al. | 425/469 |
| 4,801,158 A | 1/1989 | Gomi | |
| 4,863,198 A * | 9/1989 | Petranto | 285/39 |
| 4,878,695 A * | 11/1989 | Whitham | 285/39 |
| 5,086,843 A * | 2/1992 | Mims et al. | 166/380 |
| 5,297,819 A | 3/1994 | Harder | |
| 5,314,014 A | 5/1994 | Tucker | |
| 5,355,908 A * | 10/1994 | Berger et al. | 137/614.04 |
| 5,480,193 A * | 1/1996 | Echols et al. | 285/45 |
| 6,092,844 A * | 7/2000 | Lee | 285/90 |
| 6,241,616 B1 * | 6/2001 | Lightcap | 464/162 |
| 6,425,749 B1 * | 7/2002 | Lettner et al. | 418/182 |
| 6,705,946 B2 * | 3/2004 | Bridges | 464/8 |
| 6,772,835 B2 * | 8/2004 | Rogers et al. | 166/177.4 |
| 7,506,691 B2 * | 3/2009 | Vilela et al. | 166/381 |
| 7,527,105 B2 * | 5/2009 | Hall et al. | 166/380 |
| 2001/0015276 A1 * | 8/2001 | Pringle et al. | 166/320 |
| 2007/0257488 A1 * | 11/2007 | Jimenez | 285/404 |
| 2008/0084061 A1 * | 4/2008 | Kertesz et al. | 285/86 |

OTHER PUBLICATIONS

Quick Connect, [online]; [retrieved on Jul. 27, 2010]; retrieved from the Internet: http://www.slb.com/resources/other_resources/product_sheets/coiled_tubing/quickconnect.aspx.

International Search Report and Written Opinion; Mailed Dec. 16, 2010, International Application No. PCT/US2010/032226; International Search Report 5 Pages; Written Opinion 3 Pages.

Baker Hughes Incorporated, "Quick Connect Tool" Gravel Pack Systems—Gravel Pack Accessories, Product Family No. H44579, Baker Oil Tools, Technical Unit Unit No. TU 5821, Jun. 16, 2008, pp. 1-11.

* cited by examiner

QUICK CONNECT TOOL WITH LOCKING COLLAR

CROSS REFERENCE TO RELATED APPLICATIONS

This application claims the benefit of an earlier filing date from U.S. Provisional Application Ser. No. 61/173,391 filed Apr. 28, 2009, the entire disclosure of which is incorporated herein by reference.

BACKGROUND

Quick connect tools are known in the downhole drilling and completion industry for a number of applications and in a number of forms due to the need for efficiency in running and moving to an operational stage. Downhole completions contemplated include but are not limited to hydrocarbon production, carbon dioxide sequestration, etc. In any case, reaching an operational stage is where money is made as opposed to being spent. It is therefore not surprising that many efforts have been made over the years to increase productivity by creating configurations capable of quickly mating various components for the downhole environment and also will not be surprising to those skilled in the art that other and different quick connect configurations are needed and sought to chase the ever tightening window of efficiency.

Moreover, as advanced activities in downhole operations continue to flourish, additional components are needed with enhanced performance. For example, while control lines of many types have been run into the downhole environment for years, they generally are a part of tool strings made up with connections. Connections do work well for their intended purposes and have certainly been made use of ubiquitously but losses are a part of connections for some types of control line applications. Since any kind of improvement in function of components is always welcome to the industry, improvements in function and speed of installation of control lines will be well received by the art.

SUMMARY

A quick connect tool collar including a multipart collar body; a rib extending radially inwardly from the collar body; one or more recesses in the collar body at an inside dimension surface thereof; and one or more profiles at an outside dimension surface of the collar body.

A quick connect tool including a lift nipple; a lower body positionable within the lift nipple; a locking collar; and a connector attached to the lift nipple and receptive of the locking collar, the locking collar when assembled restricting axial and rotational movement of the lower body relative to the lift nipple.

BRIEF DESCRIPTION OF THE DRAWINGS

Referring now to the drawings wherein like elements are numbered alike in the several Figures.

DETAILED DESCRIPTION

Figure 1:
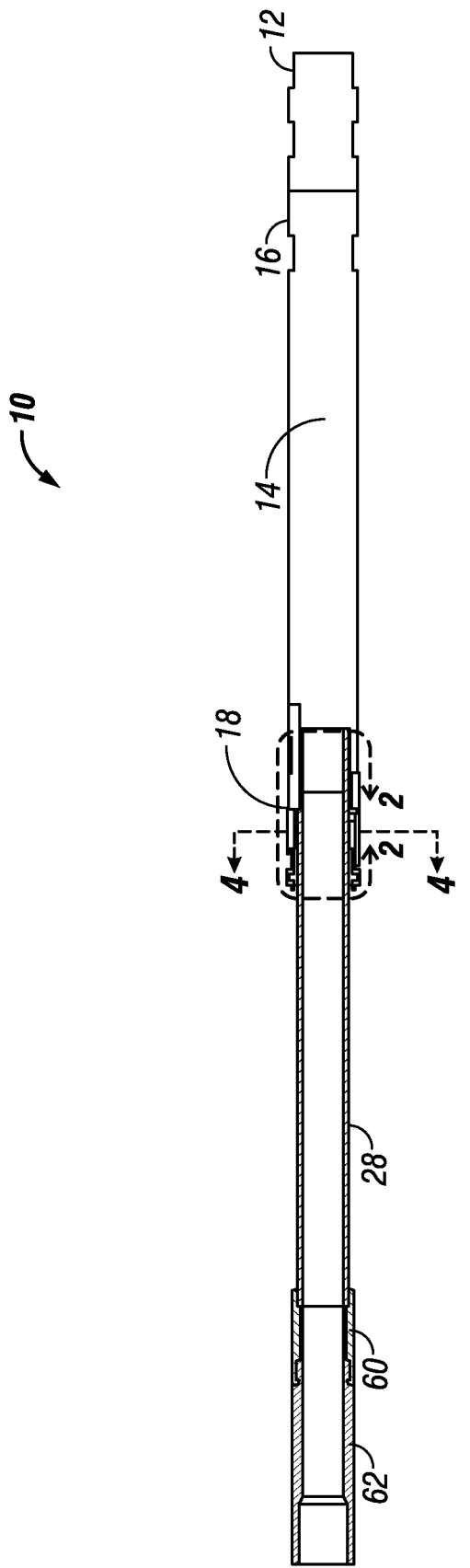
FIG. 1 is a longitudinal cross sectional view of a quick connect tool as disclosed herein.
Figure 2:
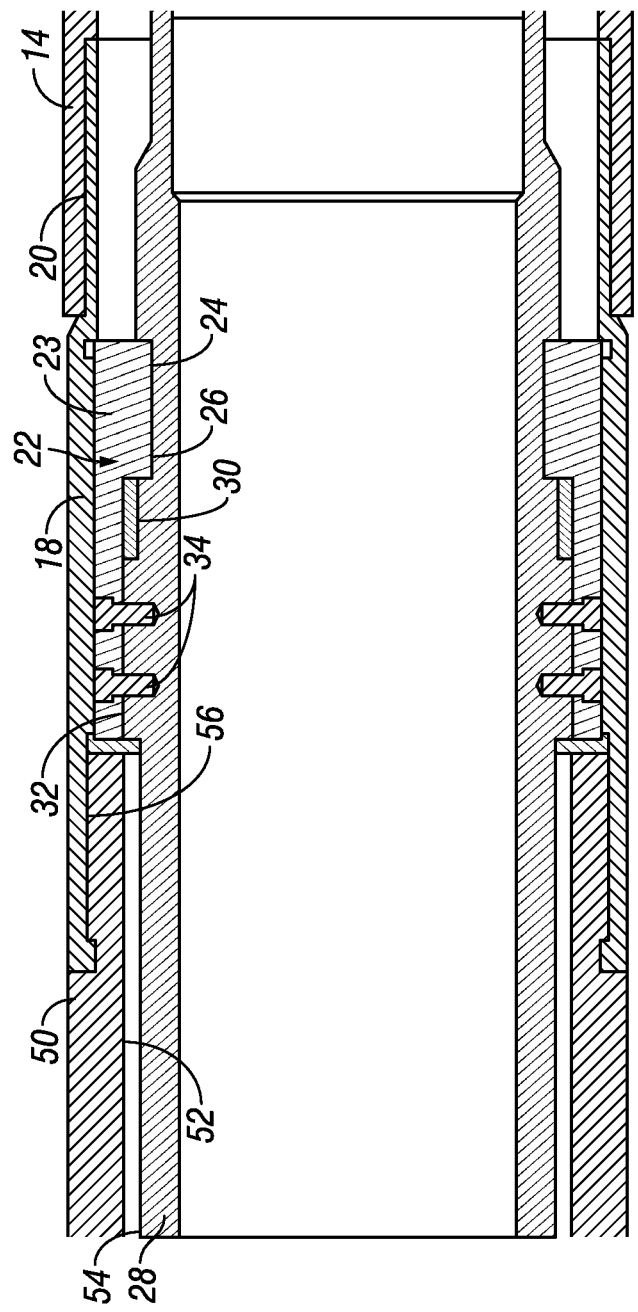
FIG. 2 is an enlarged view of FIG. 1 taken along section line 2-2.
Figure 3:
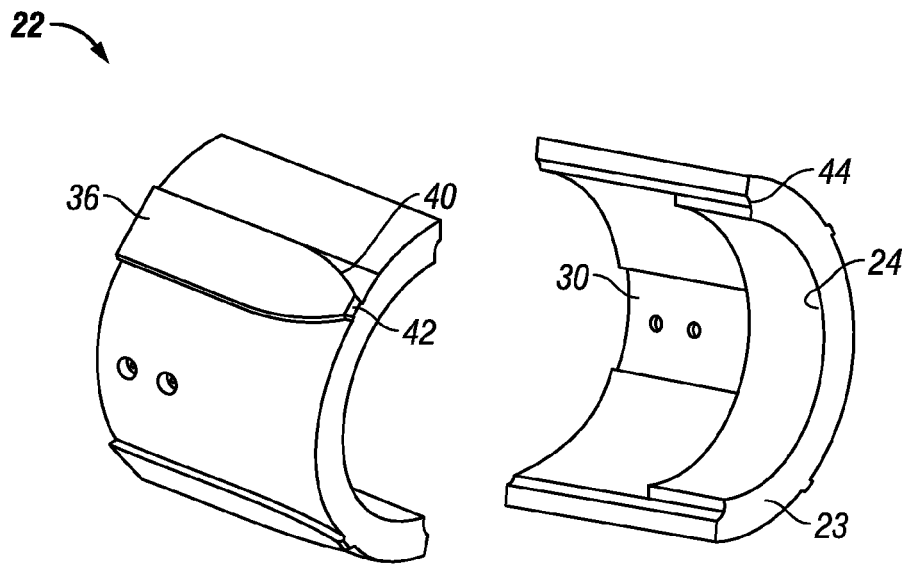
FIG. 3 is a perspective view of the locking collar positioned around the lower housing and a control line.
Figure 4:
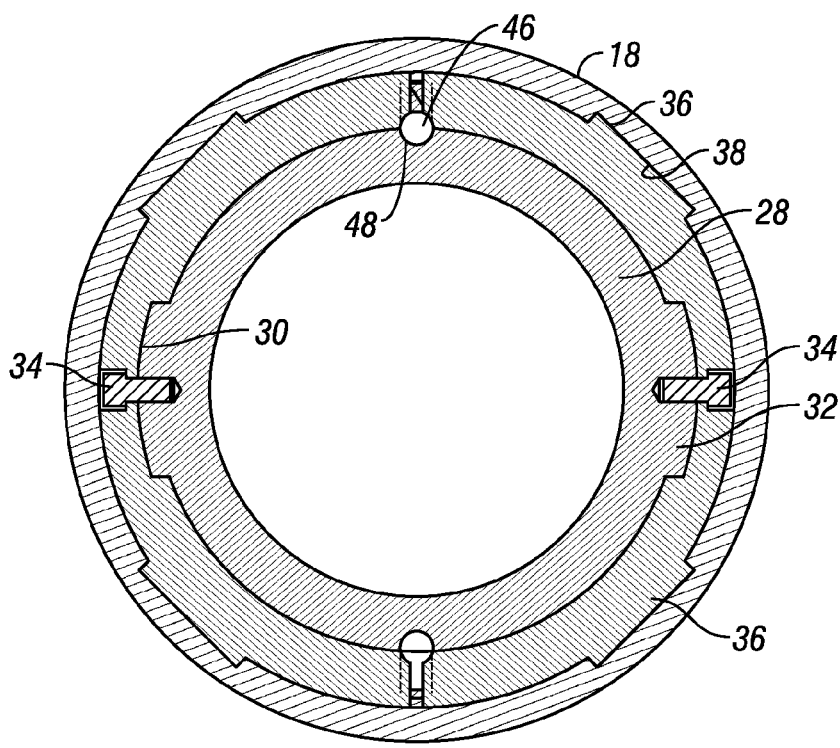
FIG. 4 is a cross sectional view of the tool in FIG. 1.

The quick connect tool as disclosed herein provides for two connections; the upper body connects the screen liner to the downhole end of a gravel pack assembly (not shown) and also the tool connects the screen liner to the outer protective shroud. The control line discussed hereunder is routed between the screen liner and the outer shroud. The connector allows for a continuous control line to pass through the connection without a connection splice. The control line has to be at the outside of the tool before it goes through the gravel pack packer so as the control line passes through the connector, the control line moves to the outside of the gravel pack assembly. This puts the control line at the outer surface of the lower body. Referring to FIG. 1, an embodiment of a quick connect tool 10 is illustrated in cross section. Illustrated in FIG. 1, beginning at a downhole end of the quick connect tool, is an outer shroud 12. The shroud is connected to a lift nipple 14 at an outside dimension thereof in area 16 by any suitable connection such as a box and pin threaded connection. At an uphole end of lift nipple 14 the lift nipple 14 is connected to a connector 18. Reference is made to FIG. 2 at this point for a better view of the next introduced components. The connector 18 is attached to the nipple 14 at thread 20. Connector 18 flares in an uphole direction as illustrated in FIG. 2 and as such is configured to receive therein a locking collar 22 comprising a multipart collar body 23. The locking collar functions to prevent both axial and rotational movement once it is affixed in position. The ability to serve this function is realized through a rib 24 extending radially inwardly of the collar body 23. The rib 24 is to be received in a groove 26 of a lower body 28. In one embodiment the groove 26 is fully annular while in alternate embodiments the groove 26 may be a part of an annulus or may be arranged in broken sections of an annulus. Any of these arrangements prevent axial movement when engaged and some also provide rotational restriction. For an embodiment where the groove 26 itself does not provide rotational restriction, or the rotational restriction the groove does provide is deemed insufficient for the application, rotational restriction is provided at an inside surface of the locking collar 22 by recesses 30 (see FIG. 3 also) that are positionable over and fixable to upsets 32 of lower body 28. Fixability is in one embodiment by fasteners 34. Locking collar 22 further includes outside surface profiles 36 that locate in recesses 38 within the connector 18 (see FIG. 4). The profiles 36 are configured to assist in assembling the tool in that they possess at a downhole end thereof a parabolic configuration 40, which helps in rotational alignment during assemblage and further include a chamfer 42 to assist in lateral alignment. Finally locking collar 22 includes a control line scallop 44 configured to closely follow an arc length of a control line 46 (see FIG. 4) that will be housed therein. The scallop 44 is present on at least one of the two halves of the locking collar 22 but note that as illustrated in FIG. 4, the scallop is located on both of the halves of locking collar 22. In fact, in the illustrated embodiment and even though a control line is not illustrated at the 6 O'clock position (in the illustration) in FIG. 4, the scallop is present on both halves of the locking collar 22. The only modification to the embodiment illustrated in FIG. 4 to accommodate another control line 46, is the provision of a groove 48 in the lower body 28 at the 6 O'clock position (in the illustration) similar to that shown in the 12 O'clock position (in the illustration). It is important to note that the term "control line" as used herein is intended to act as a generic for a hydraulic control line, a chemical injection line, a fiber optic control line, an electrical control line, etc.

Returning to FIG. 2, a lock nut 50 is threadedly connected to connector 18 at thread 56. It is to be appreciated that the lock nut 50 is possessed of an inside dimension surface 52 that is greater than an outside dimension surface 54 of the lower body 28 in order to pass one or more control lines between the inside dimension surface 50 and the outside dimension surface 52. Due to the groove 48, the actual differential dimension is less than that of the diameter of the control line 46, in one embodiment. The lock nut 50 once installed, prevents locking collar 22 from disengaging from connector 18. It is noted however that due to fasteners 34, disengagement is not likely in any event. Nevertheless, lock nut 50 increases shear out resistance and hence is included in one embodiment.

Uphole of the lock nut 50 is a further extended length of lower body 28, which is engaged with a sleeve 60 and an upper body 62 in the same way that these components are engaged in Product family number H445-79-6500 available commercially From Baker Oil Tools Houston, Tex.

Figure 5:
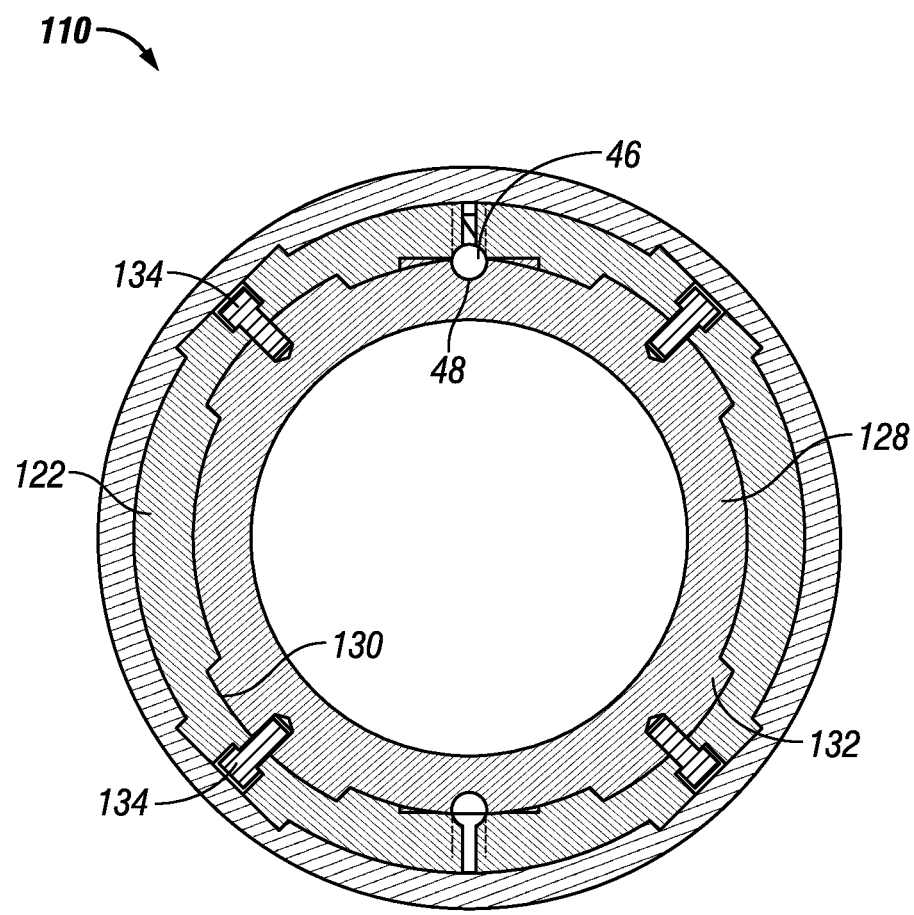
FIG. 5 is an alternate cross sectional view of the tool in FIG. 1 taken at the same place that section line 4-4 is located.

In another embodiment of the tool, identified as 110 for distinguishment from the prior described embodiment, referring to FIG. 5, it will be appreciated that the lower body 128 includes four upsets 132 instead of two as in the previous embodiment. Consequently there are also four recesses 130 in the locking collar 122 and four fasteners 134. It is to be noted that although the FIG. 5 illustration provides for two control lines 46 as does the embodiment of FIG. 4, the locking collar 122 could also be configured in a quartered configuration thereby adding accommodation for two more control lines 46 at, for example, the 3 O'clock and 9 O'clock positions (in the drawing).

While one or more embodiments have been shown and described, modifications and substitutions may be made thereto without departing from the spirit and scope of the invention. Accordingly, it is to be understood that the present invention has been described by way of illustrations and not limitation.

What is claimed is:

1. A quick connect tool comprising:
 a lift nipple;
 a lower body positionable within the lift nipple, the lower body having at least one external upset; a locking collar having a first end and a second end longitudinally positioned from the first end, the locking collar further comprising a collar body having at least two separate pieces to form the collar body, the locking collar having at least one internal recess, wherein the at least one internal recess extends substantially from the first end to an inwardly protruding circumferentially extending rib and the inwardly protruding circumferentially extending rib extends substantially to the second end; the at least one external upset located within the at least one internal recess to prevent rotational movement between the lower body and the locking collar, the locking collar further having at least one external surface profile, wherein the at least one external surface profile is a protrusion that longitudinally extends substantially from the first end to substantially the second end of the locking collar, the least one external surface profile having longitudinally extending substantially parallel walls that transition into walls that taper towards one another and end substantially at the second end; a connector attached to the lift nipple and receptive of the locking collar, the connector having at least one recess, the at least one external surface profile of the locking collar located within the at least one inner recess of the connector to prevent rotational movement between the connector and the locking collar in both clockwise and counterclockwise directions about a longitudinal axis of the quick connect tool, each of the at least one inner recess occupying a discrete segment of an inner periphery of the connector in a cross-section of the connector and spaced from adjacent recesses in the cross-section of the connector, the at least one recess engaged with and shouldering against the at least one external surface profile feature of the locking collar, the locking collar when assembled preventing axial and rotational movement of the lower body relative to the connector; and a longitudinally extending control line separate from the lower body and extending longitudinally with respect to the longitudinal axis of the quick connect tool, wherein at least one of the at least two separate pieces of the collar body including the inwardly protruding circumferentially extending rib includes a control line scalloped recess internally formed therein to receive a portion of the control line therein, the collar body configured to secure the control line between two adjacent pieces among the at least two separate pieces of the collar body, and wherein the control line scalloped recess extends the inter longitudinal length of the locking collar, wherein the at least two separate pieces are united within the connector to form the collar body, the lower body disposed between opposing pieces of the collar body.

2. A quick connect tool as claimed in claim 1 wherein the tool further comprises a lock nut positioned axially of the locking collar and locking the collar in place.

3. A quick connect tool as claimed in claim 1 wherein the locking collar is disposed within the connector, the connector includes one or more recesses into which the locking collar is receivable.

4. A quick connect tool as claimed in claim 3 wherein at least external one surface profile of the locking collar received within the one or more recesses in the connector includes a parabolically shaped downhole end.

5. A quick connect tool as claimed in claim 1 wherein the lower body includes a groove therein receptive to the locking collar to prevent axial movement between the locking collar and the lower body.

6. A quick connect tool as claimed in claim 1 wherein the lower body further includes a groove partially receptive of a control line, the control line disposed within the groove on the lower body and disposed between the lower body and the locking collar.

7. A quick connect tool as claimed in claim 1 wherein the tool includes a control line, separate from the lower body and locking collar and extending longitudinally between the lower body and the locking collar, and the tool prevents damage to the control line by restricting relative rotational movement within the tool as assembled.

8. A quick connect tool as claimed in claim 1 wherein the locking collar is disposed within the connector, and the lower body is disposed within the locking collar.

* * * * *